United States Patent
Kim et al.

(10) Patent No.: US 12,542,662 B2
(45) Date of Patent: Feb. 3, 2026

(54) APPARATUS AND METHOD FOR FEDERATED LEARNING BASED ON GROUP KEY

(71) Applicant: ELECTRONICS AND TELECOMMUNICATIONS RESEARCH INSTITUTE, Daejeon (KR)

(72) Inventors: Hyun-Jin Kim, Daejeon (KR); Jong-Geun Park, Sejong-si (KR); Jong-Hoon Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 113 days.

(21) Appl. No.: 18/416,454

(22) Filed: Jan. 18, 2024

(65) Prior Publication Data

US 2025/0141675 A1    May 1, 2025

(30) Foreign Application Priority Data

Oct. 17, 2023    (KR) .................. 10-2023-0138567

(51) Int. Cl.
*H04L 9/08* (2006.01)
*G06N 3/098* (2023.01)

(52) U.S. Cl.
CPC .............. *H04L 9/088* (2013.01); *G06N 3/098* (2023.01)

(58) Field of Classification Search
None
See application file for complete search history.

(56) References Cited

U.S. PATENT DOCUMENTS 7,434,046 B1 * 10/2008 Srivastava ............ H04L 9/0891
                                                    713/168
7,640,578 B2 * 12/2009 Vasnani .................. H04L 63/10
                                                    726/10

(Continued)

FOREIGN PATENT DOCUMENTS

KR    10-2021-0138994 A    11/2021
KR       10-2430986 B1     8/2022

OTHER PUBLICATIONS

Wenjun Song et al., "A group key exchange and secure data sharing based on privacy protection for federated learning in edge-cloud collaborative computing environment", International Journal of Network Management, Mar. 2023, pp. 1-24, e2225.

(Continued)

*Primary Examiner* — Kambiz Zand
*Assistant Examiner* — Mahabub S Ahmed
(74) *Attorney, Agent, or Firm* — Sughrue Mion, PLLC

(57) ABSTRACT

Disclosed herein is an apparatus and method for federated learning based on group key management. The apparatus receives learning group participation request information from a learning node that intends to participate in a federated learning group, updates a group key required for the learning node to participate in federated learning using a key material generated by hashing the learning group participation request information, decrypts an encrypted local variable received from the learning node and thereby updates the same to a global variable, and transmits the global variable to the learning node after encrypting the same using the updated group key.

8 Claims, 13 Drawing Sheets

(56) References Cited

U.S. PATENT DOCUMENTS

| | | | |
|---|---|---|---|
| 11,205,137 B2* | 12/2021 | Benke | H04L 9/50 |
| 2005/0018853 A1* | 1/2005 | Lain | H04L 63/064 |
| | | | 380/277 |
| 2005/0086470 A1* | 4/2005 | Strobl | H04L 9/0841 |
| | | | 713/171 |
| 2015/0293968 A1* | 10/2015 | Dickie | G06F 16/244 |
| | | | 707/738 |
| 2016/0147805 A1* | 5/2016 | Benke | G06F 16/278 |
| | | | 707/741 |
| 2019/0140832 A1* | 5/2019 | Leavy | H04L 9/3247 |
| 2020/0127817 A1* | 4/2020 | Wu | H04L 9/0819 |
| 2020/0394518 A1* | 12/2020 | Sirdey | G06N 3/08 |
| 2021/0026830 A1* | 1/2021 | Jain | H04L 63/1425 |
| 2021/0084010 A1* | 3/2021 | Alharbi | H04L 63/104 |
| 2021/0143987 A1* | 5/2021 | Xu | H04L 63/062 |
| 2021/0150037 A1* | 5/2021 | Radhakrishnan | G06N 3/08 |
| 2021/0158167 A1* | 5/2021 | Sharma | H04L 67/10 |
| 2021/0174243 A1* | 6/2021 | Angel | H04L 9/083 |
| 2021/0398017 A1* | 12/2021 | Garg | H04L 9/50 |
| 2022/0066456 A1* | 3/2022 | Ebrahimi Afrouzi | |
| | | | G06F 3/04883 |
| 2022/0210140 A1* | 6/2022 | Dhunay | G06N 20/00 |
| 2022/0239683 A1* | 7/2022 | Kaliya Perumal | H04L 63/1408 |
| 2022/0245528 A1* | 8/2022 | Behera | H04L 9/0894 |
| 2022/0318688 A1* | 10/2022 | Xiao | G06N 20/20 |
| 2022/0376900 A1* | 11/2022 | Wang | H04L 9/14 |
| 2022/0383091 A1* | 12/2022 | Das | G06N 3/084 |
| 2023/0013314 A1* | 1/2023 | Bernat | H04L 63/068 |
| 2023/0025754 A1* | 1/2023 | Hassanzadeh | G06N 20/00 |
| 2023/0044035 A1* | 2/2023 | Martins | G06N 3/09 |
| 2023/0050655 A1* | 2/2023 | Song | G06N 3/084 |
| 2023/0068770 A1 | 3/2023 | Cheng et al. | |
| 2023/0076024 A1 | 3/2023 | Baek et al. | |
| 2023/0177349 A1* | 6/2023 | Balakrishnan | G06N 3/084 |
| | | | 706/25 |
| 2023/0188319 A1* | 6/2023 | Froelicher | G06F 7/544 |
| | | | 713/189 |
| 2023/0217195 A1* | 7/2023 | Poltorak | H04R 25/609 |
| | | | 381/315 |
| 2023/0328043 A1* | 10/2023 | Han | H04L 9/008 |
| | | | 713/168 |
| 2024/0015003 A1* | 1/2024 | Prasad | G06N 20/00 |
| 2024/0064016 A1* | 2/2024 | Mozaffari | H04L 9/008 |
| 2024/0070469 A1* | 2/2024 | Tsuchida | G06F 21/6218 |
| 2024/0080180 A1* | 3/2024 | Hsu | G06N 20/00 |
| 2024/0086717 A1* | 3/2024 | Liu | G06N 3/098 |
| 2024/0135194 A1* | 4/2024 | Kim | G06N 7/01 |
| 2024/0155025 A1* | 5/2024 | Akdeniz | G06N 3/084 |
| 2024/0177018 A1* | 5/2024 | Gupta | H04L 9/08 |
| 2024/0265303 A1* | 8/2024 | Li | G06N 20/00 |
| 2024/0289638 A1* | 8/2024 | Avestimehr | G06N 3/098 |
| 2024/0320473 A1* | 9/2024 | Wang | H04L 9/0662 |
| 2024/0396718 A1* | 11/2024 | Soriente | H04L 9/0869 |
| 2024/0413969 A1* | 12/2024 | d'Aliberti | H04L 9/008 |
| 2025/0023706 A1* | 1/2025 | Ott | G06N 3/098 |
| 2025/0045632 A1* | 2/2025 | Lage Serrano | G06N 20/20 |
| 2025/0062896 A1* | 2/2025 | Nie | H04L 9/0858 |
| 2025/0068766 A1* | 2/2025 | Gupta | G06F 21/6245 |
| 2025/0068929 A1* | 2/2025 | Yan | G06N 3/098 |
| 2025/0068971 A1* | 2/2025 | Kaga | G06N 20/20 |
| 2025/0070971 A1* | 2/2025 | Wang | H04L 9/008 |
| 2025/0103899 A1* | 3/2025 | Wu | G06N 3/098 |
| 2025/0119296 A1* | 4/2025 | Soykan | G06N 20/00 |

OTHER PUBLICATIONS

Sneha Kanchan et al., "Efficient and privacy-preserving group signature for federated learning", Future Generation Computer Systems, May 5, 2023, pp. 93-106, 147.

* cited by examiner

APPARATUS AND METHOD FOR FEDERATED LEARNING BASED ON GROUP KEY

CROSS REFERENCE TO RELATED APPLICATION

This application claims the benefit of Korean Patent Application No. 10-2023-0138567, filed Oct. 17, 2023, which is hereby incorporated by reference in its entirety into this application.

BACKGROUND OF THE INVENTION

1. Technical Field

The present disclosure relates generally to technology for training an Artificial Intelligence (AI) model, and more particularly to technology for federated learning based on group key management.

2. Description of the Related Art

AI technology shows excellent performance that is sufficient to successfully solve problems that are difficult for humans to solve across all areas of society, such as chatbots, autonomous vehicles, cybersecurity, and the like, and has improved various models, such as Bidirectional Encoder Representations from Transformers (BERT), Generative Pre-trained Transformer (GPT), and the like, through an existing model-driven approach. However, in the case of an AI-based intelligent solution, a data-driven approach that focuses on domain data depending on the quantity and quality of data, that is, the diversity and amount of data used in a learning process, greatly affects performance. This is because it is constructed in such a way that an AI model learns a dataset and an artificial neural network sends data to a central server. Existing machine learning frameworks have a structure in which all client nodes transmit data to a central cloud, a central server trains a model using the collected data, and the client nodes receive the result of the model update from the cloud server. However, a recently released Large Language Model (LLM) uses more than hundreds of billions of parameters, so it is impossible to calculate such a huge number of parameters on a single server. As technology for solving this problem, distributed learning emerged, and the types thereof include model parallelism and data parallelism.

Model parallelism is a method in which a single model is uploaded and trained on multiple servers or GPUs. This can be used when memory of a single GPU is not able to process the parameters of the model. Data parallelism may reduce model training time by training the same model with different data samples on multiple servers. Moreover, federated learning based on data parallelism may solve data privacy problems when multiple servers contain sensitive and important data. In order to solve the data privacy problems, a distributed AI learning structure, in which respective servers jointly perform a complex learning operation, is required, instead of existing centralized learning.

Also, federated learning is performed by a central server and a group of learning nodes participating in the learning, in which case the performance of a federated learning model is determined depending on the data possessed by the distributed learning nodes. Here, how to manage the learning group between the central server and the learning nodes is very important. In order to establish one-to-many or many-to-many communication, an existing communication process is configured to manage group users by sharing a common secret key among the communication members and to use a group key so as to allow only the group users to access data. Here, in order to maintain the confidentiality of the data when the participants of the group change, a group key management technique for updating the group key to a new key for regeneration and redistribution of the group key has been researched. The group key management technique includes two essential requirements: forward secrecy, which means that a participant leaving the group should not be made aware of existing communication content, and backward secrecy, which means that a new user joining the group should not be made aware of the previous communication content. The group key management technique may be categorized into centralized group key management, decentralized group key management, and distributed group key management depending on the structure thereof.

The centralized group key management structure has an intuitive management structure (a single key server managing the entire group), but has a scalability problem when participants of a group frequently change. Also, although group key calculation and storage costs can be easily expressed using big-O notation, there is a single point of failure problem that paralyzes the entire group when a group key server fails. The types thereof include a management technique based on pairwise keys, a management technique based on a hierarchical tree, and the like.

The decentralized group key management structure may be applied to a group, the participants of which frequently change, and may solve a single point of failure problem and a 1-affect-N problem. However, a key management method for subgroups is required, and a trust relationship between the subgroups is required. The types thereof include a common Traffic Encryption Key (TEK) method and an independent TEK method.

The distributed group key management structure may solve a single point of failure problem, but because a lot of cost and time are consumed for updating a key, it is suitable for a static group. The types thereof include a ring-based contribution method and a hierarchical contribution method.

When federated learning is performed in an edge network environment, data possessed by each node affects global variables of a learning model and the performance of the entire model. Furthermore, when a variable is exposed while parameters are being sent and received between a central server and an edge node or a learning node in the federated learning process, which may affect the security of the overall framework. Accordingly, management functions for forming, expanding, and changing a learning group including learning nodes participating in federated learning and the security of information transmitted in a communication process between the nodes are recognized as very important parts, and the present disclosure intends to solve these issues using a group key management technique.

Meanwhile, Korean Patent No. 10-2430986, titled "Method for performing federated learning based on blockchain in hybrid system" relates to a method for performing federated learning based on blockchain in a hybrid system, and discloses a method for performing federated learning based on blockchain that is capable of managing federated learning result data and rewarding clients contributing to federated learning while ensuring the privacy of users' personal information that may arise in federated learning.

SUMMARY OF THE INVENTION

An object of the present disclosure is to manage a learning group between a distributed edge network and a central server or between federated learning nodes and the central server or an edge node in order to operate and manage an AI-based network.

Another object of the present disclosure is to solve a model privacy problem that may arise in a process of transmitting shared variables between participating nodes of a learning group, thereby providing maintenance and dynamic management functions for a secure federated learning mechanism.

A further object of the present disclosure is to build a scalable and secure federated learning environment in a mobile communication network environment.

Yet another object of the present disclosure is to apply the present disclosure to state-of-the-art AI and federated-learning-based analysis/detection service fields to be applied to various distributed edge network environments, such as 5G, 6G, and the like, in the future.

In order to accomplish the above objects, an apparatus for federated learning based on group key management according to an embodiment of the present disclosure includes one or more processors and memory for storing at least one program executed by the one or more processors, and the at least one program may receive learning group participation request information from a learning node that intends to participate in a federated learning group, update a group key required for the learning node to participate in the federated learning using a key material generated by hashing the learning group participation request information, decrypt an encrypted local variable received from the learning node and thereby update the local variable to a global variable, and transmit the global variable to the learning node after encrypting the global variable using the updated group key.

Here, the at least one program may generate an initial group key in the form of a random number.

Here, the at least one program may generate a new group key by performing an XOR operation on the key material and the initial group key.

Here, the learning node may generate a key material by hashing the learning group participation request information and perform an XOR operation on the initial group key and the key material, thereby generating a group key that is identical to the new group key.

Here, the at least one program may generate a node key for encrypting the local variable of the learning node from the key material using a preset key derivation function.

Here, the learning node may generate the local variable and encrypt the local variable using the node key.

Here, the at least one program may decrypt the encrypted local variable received from the learning node using the node key.

Also, in order to accomplish the above objects, a method for federated learning based on group key management, performed by an apparatus for federated learning based on group key management, according to an embodiment of the present disclosure includes receiving learning group participation request information from a learning node that intends to participate in a federated learning group, updating a group key required for the learning node to participate in the federated learning using a key material generated by hashing the learning group participation request information, decrypting an encrypted local variable received from the learning node and thereby updating the local variable to a global variable, and transmitting the global variable to the learning node after encrypting the same using the updated group key.

Here, receiving the learning group participation request information may comprise generating an initial group key in the form of a random number.

Here, updating the group key may comprise generating a new group key by performing an XOR operation on the key material and the initial group key.

Here, updating the group key may comprise generating, by the learning node, a key material by hashing the learning group participation request information and performing, by the learning node, an XOR operation on the initial group key and the key material, thereby generating a group key that is identical to the new group key.

Here, receiving the learning group participation request information may comprise generating a node key for encrypting the local variable of the learning node from the key material using a preset key derivation function.

Here, updating the local variable may comprise generating, by the learning node, the local variable and encrypting, by the learning node, the local variable using the node key.

Here, transmitting the global variable may comprise decrypting the encrypted local variable received from the learning node using the node key.

BRIEF DESCRIPTION OF THE DRAWINGS

The above and other objects, features, and advantages of the present disclosure will be more clearly understood from the following detailed description taken in conjunction with the accompanying drawings, in which.

DESCRIPTION OF THE PREFERRED EMBODIMENTS

Figure 1:
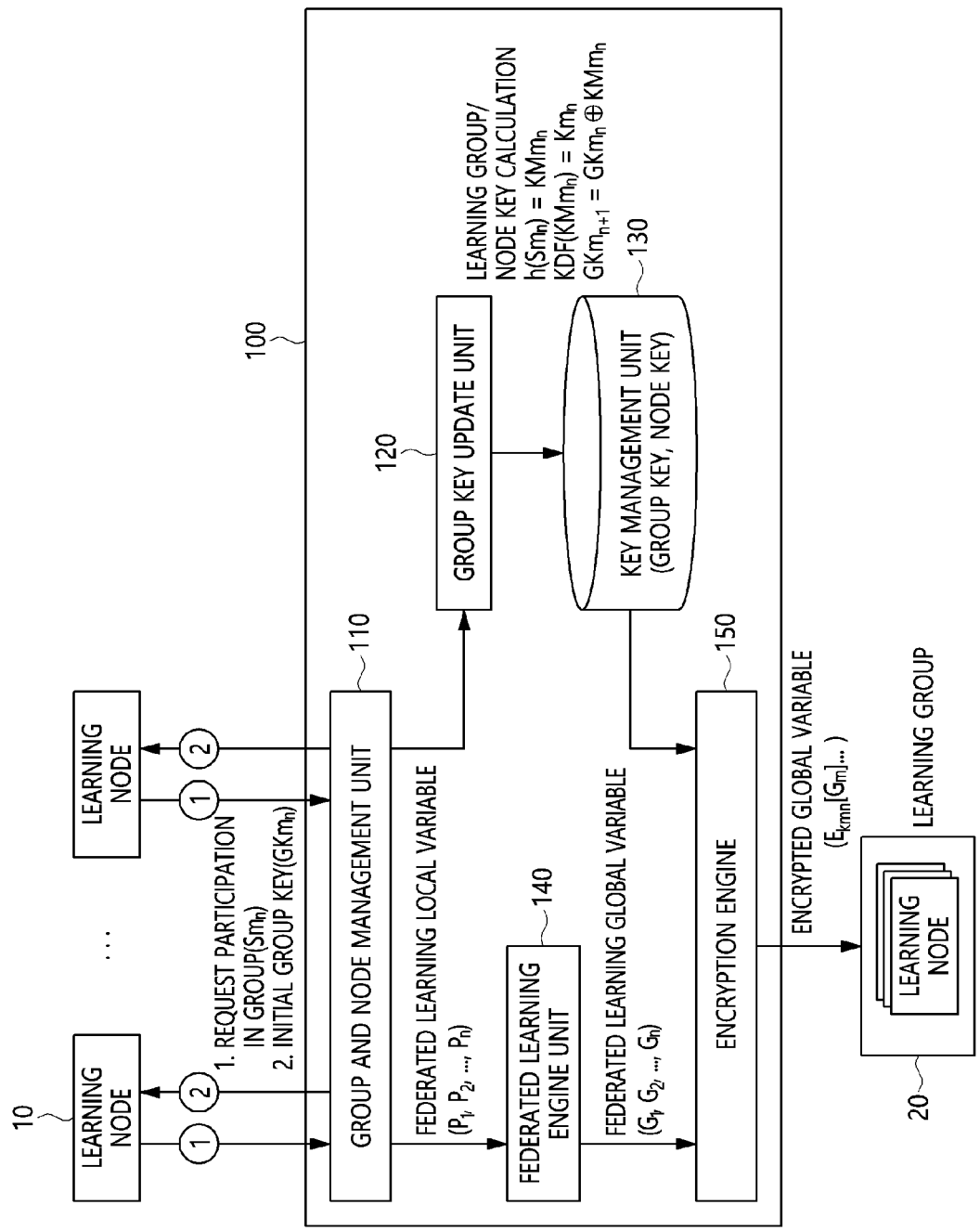
FIG. 1 is a block diagram illustrating an apparatus for federated learning based on group key management according to an embodiment of the present disclosure.

The present disclosure will be described in detail below with reference to the accompanying drawings. Repeated descriptions and descriptions of known functions and configurations which have been deemed to unnecessarily obscure the gist of the present disclosure will be omitted below. The embodiments of the present disclosure are intended to fully describe the present disclosure to a person having ordinary knowledge in the art to which the present disclosure pertains. Accordingly, the shapes, sizes, etc. of components in the drawings may be exaggerated in order to make the description clearer.

Throughout this specification, the terms "comprises" and/or "comprising" and "includes" and/or "including" specify the presence of stated elements but do not preclude the presence or addition of one or more other elements unless otherwise specified.

Hereinafter, a preferred embodiment of the present disclosure will be described in detail with reference to the accompanying drawings.

FIG. 1 is a block diagram illustrating an apparatus for federated learning based on group key management according to an embodiment of the present disclosure.

Referring to FIG. 1, an apparatus 100 for federated learning based on group key management according to an embodiment of the present disclosure may perform federated learning for training an AI model through cooperation, without directly sharing data stored across multiple nodes in a distributed manner.

The apparatus 100 for federated learning based on group key management according to an embodiment of the present disclosure applies a group key management mechanism between a central server and nodes in environments, such as a Mobile Edge Cloud (MEC), a distributed network, and the like, thereby providing a learning node update and management method through which nodes participating in learning are able to join and leave federated learning in units of learning groups.

To this end, the apparatus 100 for federated learning based on group key management according to an embodiment of the present disclosure applies a group key management mechanism based on an extended B-tree, in which learning nodes are located below a central server or an edge node, when the learning nodes generate a federated learning group for generating and managing a global model in the central server in a network environment including multiple nodes, thereby facilitating the management of the learning nodes in a hierarchical manner.

Here, the apparatus 100 for federated learning based on group key management according to an embodiment of the present disclosure may operate a secure federated learning mechanism by encrypting transmission data and model-related information to be stored.

More specifically, the apparatus 100 for federated learning based on group key management according to an embodiment of the present disclosure may perform federated learning in such a way that a server designates learning nodes in a federated learning structure including the server and learning nodes.

Here, in the process in which the central server designates each learning node and performs learning in a large-scale network environment, the update and management of the learning nodes may cause overhead to the central server depending on the number of learning nodes. Also, in the process of updating training information shared with the central server, there may be a problem related to the security of a communication channel over which global/local variables are transmitted. Accordingly, in order to solve the problems related to learning node management and the security of the transmitted information, the respective learning nodes and the central server may generate a learning group and then generate a group key for secure communication and data sharing within the group. Also, when a new learning node joins the learning group or when an existing learning node leaves the learning group, a key material for updating the group key is shared in order to satisfy forward secrecy and backward secrecy, and the group key is updated through calculation using the key material and the existing group key, whereby the security of the communication channel may be maintained. In this process, rather than transmitting the group key itself from the central server through unicast, nodes intending to participate in federated learning and nodes on the way to the central server may individually update the group key using the key material information. Also, in order to protect data shared between the learning nodes or edge nodes included in the learning group, the shared data is encrypted with a group key of the edge node or the central server, and when the edge group key is updated, the data is encrypted again with the updated group key, whereby the security of the shared data may be guaranteed in the federated learning process. Also, hierarchical federated learning through which multiple learning groups are able to perform federated learning based on a central server in a hierarchical manner may be performed in order to dynamically generate various models for application fields and configurations of learning groups as AI technology is used in various fields.

Referring to FIG. 1, the apparatus 100 for federated learning based on group key management according to an embodiment of the present disclosure includes a group and node management unit 110, a group key update unit 120, a key management unit 130, a federated learning engine unit 140, and an encryption engine unit 150.

First, the apparatus 100 for federated learning based on group key management according to an embodiment of the present disclosure may generate a group key and share the same group key with learning nodes.

The group and node management unit 110 may receive learning group participation request information $Sm_n$ from a learning node 10 that intends to participate in federated learning.

Here, the group and node management unit 110 may generate an initial group key in the form of a random number in order to generate a learning node group.

Here, the group and node management unit 110 may transmit the received learning group participation request information to the group key update unit 120 depending on a result of authentication of the learning node and determination of whether to allow participation of the learning node.

The group key update unit 120 may update the group key, which is required for the learning node to participate in the federated learning, using a key material generated by hashing the participation request information.

Here, the group key update unit 120 may generate a key material by hashing the participation request information as shown in Equation (1):

$$h(Sm_n) = KMm_n \qquad (1)$$

Here, the group key update unit 120 may generate a node key for encrypting a local variable of the learning node from the key material using a preset Key Derivation Function (KDF) as shown in Equation (2):

$$KDF(KMm_n) = Km_n \qquad (2)$$

Here, the group key update unit 120 may update the group key by performing an XOR operation on the arbitrarily generated initial group key and the key material as shown in Equation (3):

$$GKm_{n+1} = GKm_n \oplus KMm_n \quad (3)$$

Here, the group key update unit 120 may transmit the generated node key and the updated group key to the key management unit 130.

Here, when the process of participating in the learning group is completed, the group key update unit 120 may transmit the initial group key, which is to be used to update the group key, to the learning node 10 along with a participation completion message.

Here, the learning node 10 generates a key material by hashing the learning group participation request information and performs an XOR operation on the initial group key and the key material, thereby generating a group key that is identical to the group key generated by the apparatus 100 for federated learning based on group key management.

Also, the apparatus 100 for federated learning based on group key management according to an embodiment of the present disclosure may update the group key when a new learning node joins the existing learning group.

The group and node management unit 110 may receive learning group participation request information $Sm_{n+1}$ from a learning node 10 that intends to participate in federated learning.

Here, the group and node management unit 110 may transmit the received learning group participation request information to the group key update unit 120 depending on a result of authentication of the learning node and determination of whether to allow participation of the learning node.

The group key update unit 120 may generate a key material by hashing the participation request information as shown in Equation (1).

Here, the group key update unit 120 may generate a key material and a variable encryption key from the learning group participation request information $Sm_{n+1}$.

Here, the group key update unit 120 may update the group key using the existing group key and the key material as shown in Equation (4):

$$GKm_{n+1} = GKm_n \oplus KMm_{n+1} \quad (4)$$

Here, the group key update unit 120 may transmit the newly generated key material to the existing first learning node.

The first learning node performs an XOR operation on the newly generated key material and the existing group key, thereby updating the existing group key to a new group key $GKm_{n+1}$.

Here, the group key update unit 120 may transmit the existing group key $GKm_n$ to the second learning node that intends to newly participate in the learning group.

Here, the second learning node generates a key material by hashing the learning group participation request information and performs an XOR operation on the received existing group key and the key material, thereby generating a group key identical to the group key generated by the apparatus 100 for federated learning based on group key management.

The key management unit 130 may store the node key generated by the group key update unit 120 and the group key updated by the group key update unit 120.

The learning node 10 may generate a local variable and encrypt the same using the node key.

Here, the learning node 10 may transmit the encrypted local variable to an edge node.

The federated learning engine unit 140 may decrypt the received encrypted local variable using the node key that was generated and stored when the learning node 10 participated in the group.

Here, the federated learning engine unit 140 may update the local variable to a global variable through operation with local variables received from other learning nodes.

The encryption engine unit 150 may share data required for learning using the group key when federated learning is performed.

The encryption engine unit 150 may share essential data and authenticate the learning group using the group key.

Here, the encryption engine unit 150 may encrypt the global variable using the group key and transmit the same to the respective learning nodes.

Accordingly, the apparatus 100 for federated learning based on group key management according to an embodiment of the present disclosure ensures secure data sharing and group management in the learning group and secure transmission of local variables, thereby improving the security of the federated learning framework.

Also, the apparatus 100 for federated learning based on group key management according to an embodiment of the present disclosure may generate various learning models by dynamically generating learning groups by enabling hierarchical federated learning, through which multiple learning groups are able to perform federated learning using a shared group key.

Figure 2:
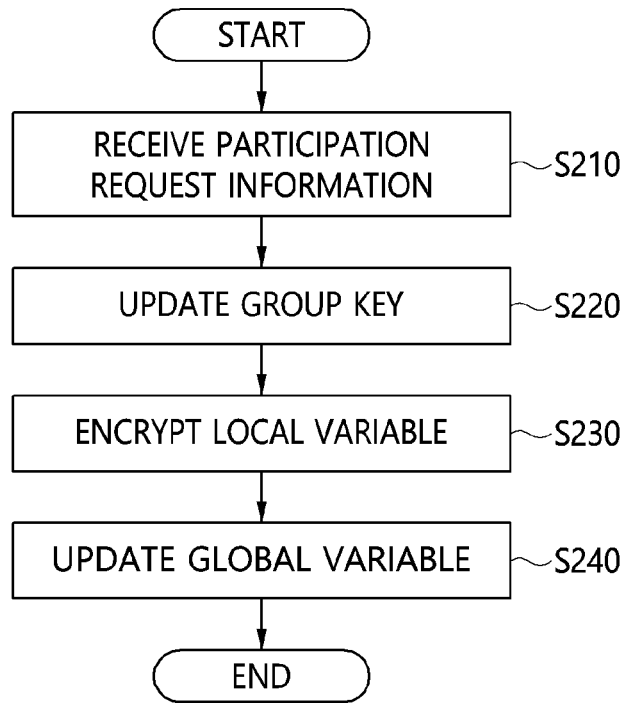
FIG. 2 is a flowchart illustrating a method for federated learning based on group key management according to an embodiment of the present disclosure.
Figure 3:
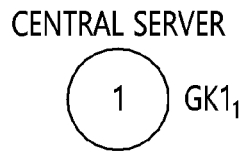
FIGS. 3 to 6 are views illustrating a process of generating a federated learning group using a group key update according to an embodiment of the present disclosure.
Figure 4:
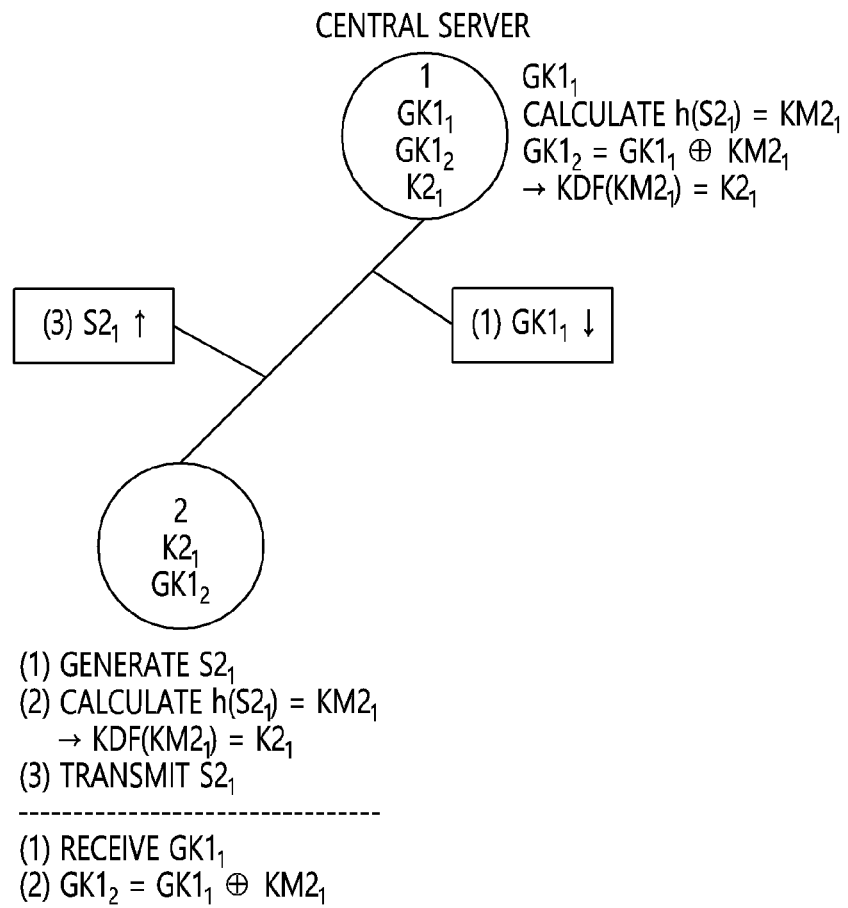
Figure 5:
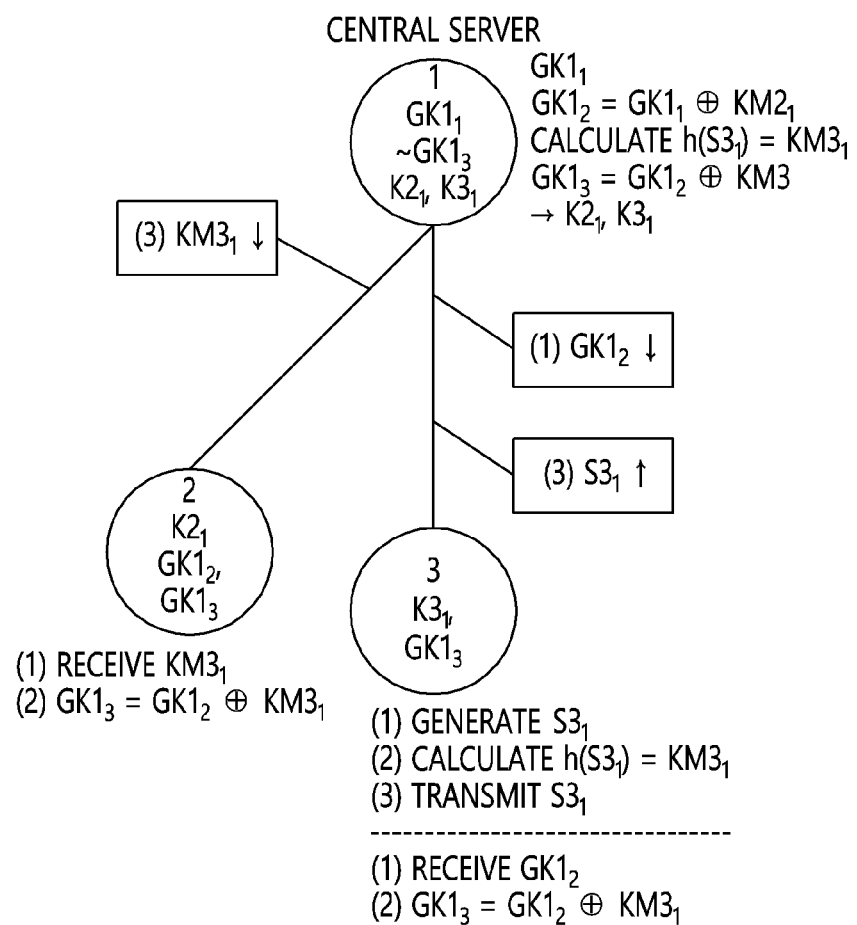
Figure 6:
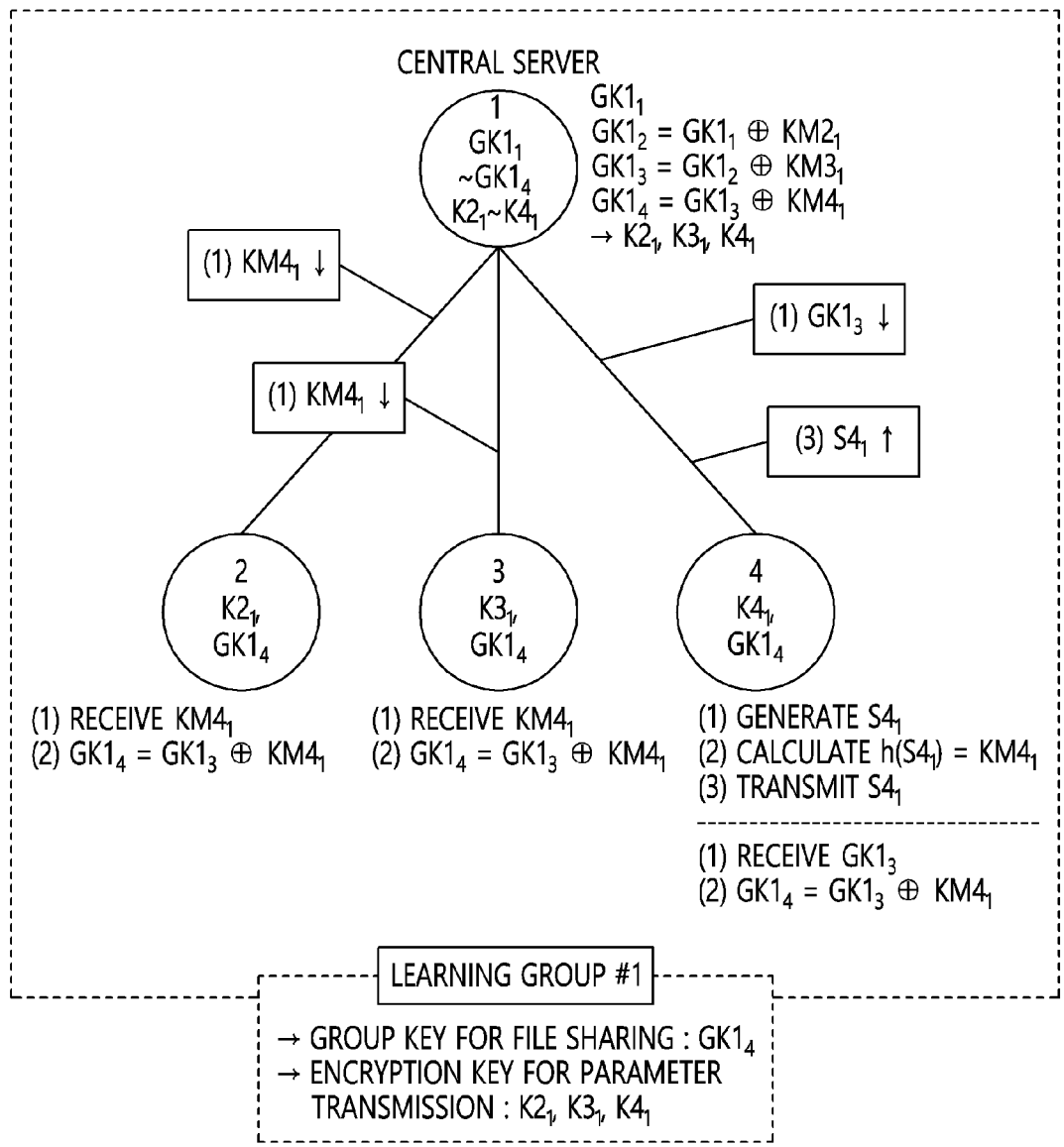

FIG. 2 is a flowchart illustrating a method for federated learning based on group key management according to an embodiment of the present disclosure.

Referring to FIG. 2, in the method for federated learning based on group key management according to an embodiment of the present disclosure, first, participation request information may be received at step S210.

That is, at step S210, learning group participation request information $Sm_n$ may be received from a learning node 10 that intends to participate in federated learning.

Here, at step S210, an initial group key in the form of a random number may be generated in order to generate a learning node group.

Here, at step S210, the received learning group participation request information may be transmitted to the group key update unit 120 depending on a result of authentication of the learning node 10 and determination of whether to allow participation of the learning node 10.

Also, in the method for federated learning based on group key management according to an embodiment of the present disclosure, a group key may be updated at step S220.

That is, at step S220, the participation request information is hashed as shown in Equation (1), whereby a key material may be generated.

Here, at step S220, a node key for encrypting a local variable of the learning node may be generated from the key material using a preset Key Derivation Function (KDF) as shown in Equation (2).

Here, at step S220, the group key may be updated by performing an XOR operation on the arbitrarily generated initial group key and the key material as shown in Equation (3).

Here, at step S220, the generated node key and the updated group key may be transmitted to the key management unit 130.

Here, at step S220, when a process for participation in the learning group is completed, the initial group key to be used to update the group key may be transmitted to the learning node 10 along with a participation completion message.

Here, at step S220, the learning node 10 generates a key material by hashing the learning group participation request information and performs an XOR operation on the initial group key and the key material, thereby generating a group key identical to the group key generated by the apparatus 100 for federated learning based on group key management.

Also, in the method for federated learning based on group key management according to an embodiment of the present disclosure, the group key may be updated when a new learning node joins the existing learning group at steps S210 and S220.

That is, at step S210, learning group participation request information $Sm_n+1$ may be received from a new learning node 10 intending to participate in federated learning.

Here, at step S210, the received learning group participation request information may be transmitted to the group key update unit 120 depending on a result of authentication of the learning node and determination of whether to allow participation of the learning node.

Also, at step S220, a key material may be generated by hashing the participation request information as shown in Equation (1).

Here, at step S220, the key material and a variable encryption key may be generated from the learning group participation request information $Sm_n+1$.

Here, at step S220, the group key may be updated using the existing group key and the key material as shown in Equation (4):

$$GKm_{n+1} = GKm_n \oplus KMm_{n+1} \quad (4)$$

Here, at step S220, the newly generated key material may be transmitted to the existing first learning node.

Here, at step S220, the first learning node performs an XOR operation on the newly generated key material and the existing group key, thereby updating the existing group key to a new group key $GKm_n+1$.

Here, at step S220, the existing group key $GKm_n$ may be transmitted to the second learning node intending to newly participate in the learning group.

Here, at step S220, the second learning node generates a key material by hashing the learning group participation request information and performs an XOR operation on the existing group key and the key material, thereby generating a group key that is identical to the group key generated by the apparatus 100 for federated learning based on group key management.

Here, at step S220, the generated node key and the updated group key may be stored.

Also, in the method for federated learning based on group key management according to an embodiment of the present disclosure, a local variable may be encrypted at step S230.

That is, at step S230, the learning node 10 may generate a local variable and encrypt the same using the node key.

Here, at step S230, the learning node 10 may transmit the encrypted local variable to the federated learning engine unit 140.

Also, in the method for federated learning based on group key management according to an embodiment of the present disclosure, a global variable may be updated at step S240.

That is, at step S240, the variable may be decrypted using the node key that was generated and stored when the learning node 10 participated in the group.

Here, at step S240, the variable may be updated to a global variable through an operation with local variables received from other learning nodes.

Here, at step S240, data required for learning may be shared using the group key when federated learning is performed.

Here, at step S240, essential data may be shared and the learning group may be authenticated using the group key.

Here, at step S240, the global variable may be transmitted to the respective learning nodes after being encrypted using the group key.

FIGS. 3 to 6 are views illustrating a process of generating a federated learning group using a group key update according to an embodiment of the present disclosure.

Referring to FIGS. 3 to 6, it can be seen that the process of generating a federated learning group by updating the generated group key is illustrated. It can be seen that a central server generates a learning group and has encryption keys $K2_1$, $K3_1$, and $K4_1$ for encrypting variables received from respective learning nodes. Also, it can be seen that the central server stores a group key $GK1_1$ for data sharing, which is required to encrypt and share essential data that should be included in order to perform learning.

Here, it can be seen that the central server updates the group key by transmitting the group key to the respective learning nodes.

Here, it can be seen that the central server transmits the variable encrypted using the encryption key to the respective learning nodes.

Figure 7:
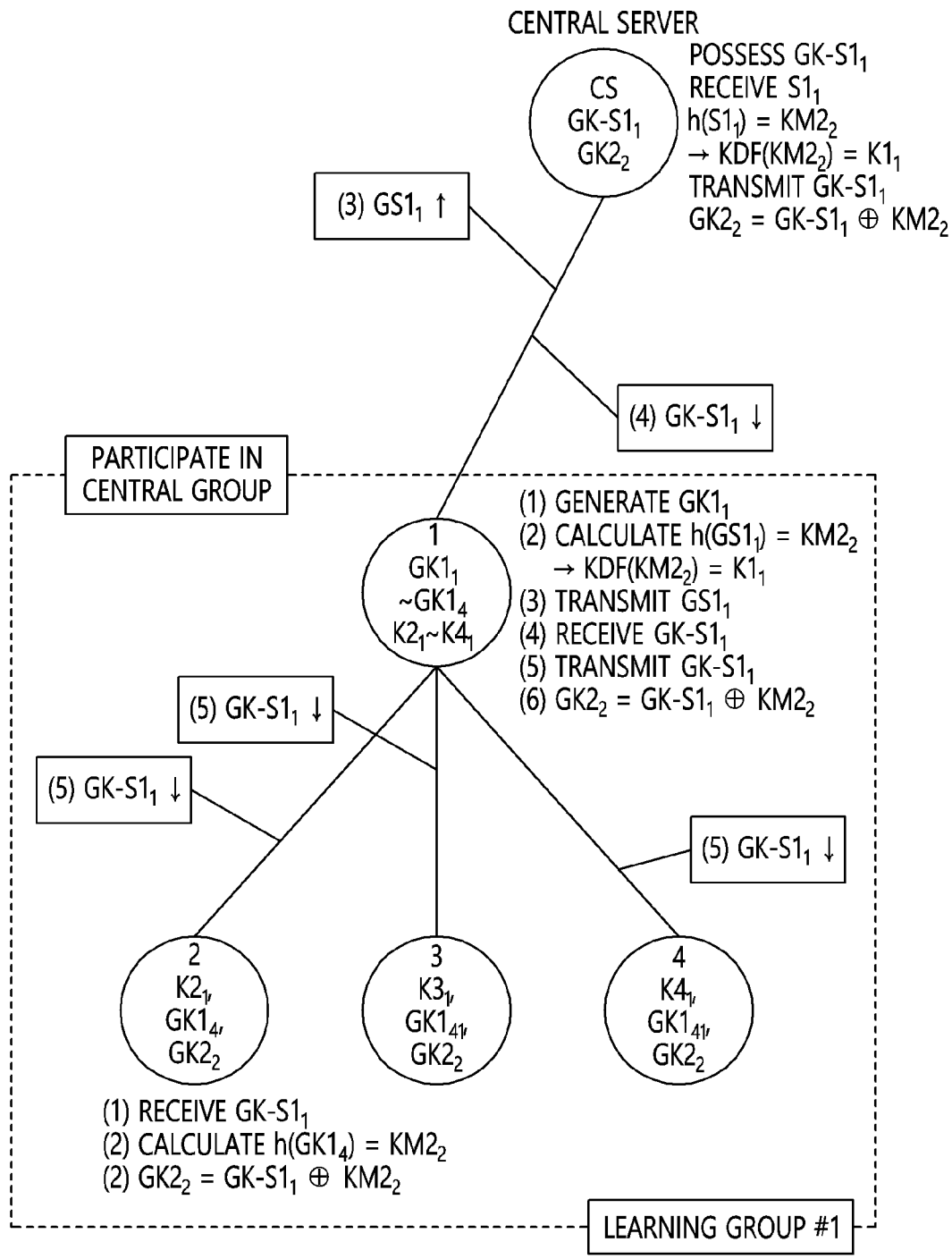
FIG. 7 and FIG. 8 are views illustrating a process of participating in a federated learning group along with other learning groups according to an embodiment of the present disclosure.
Figure 8:
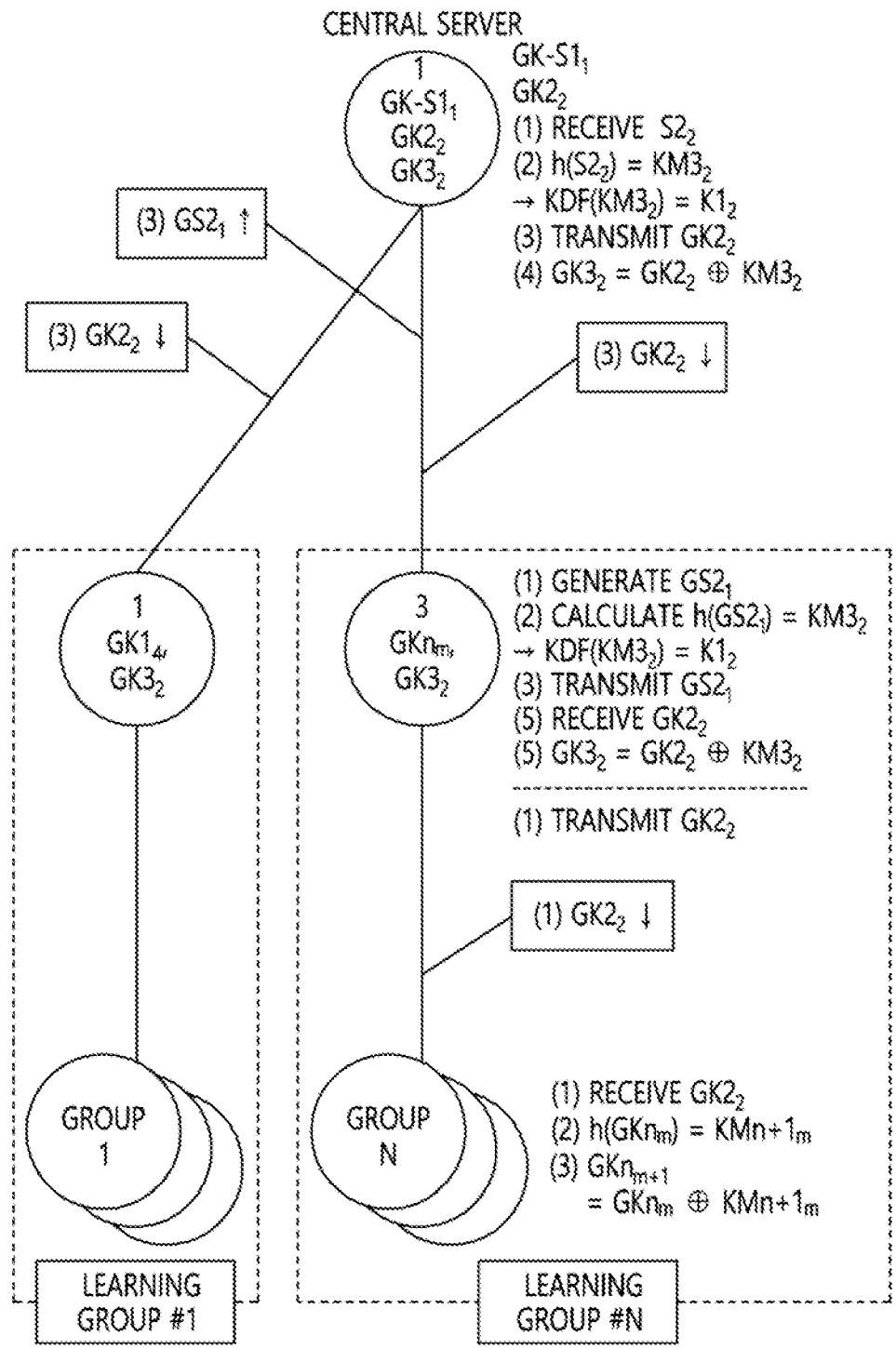

FIG. 7 and FIG. 8 are views illustrating a process of participating in a federated learning group along with other learning groups according to an embodiment of the present disclosure.

Referring to FIG. 7 and FIG. 8, it can be seen that a process in which, when respective learning groups intend to perform federated learning with an additional learning group, a federated learning group is generated based on a central server is illustrated. First, as illustrated in FIG. 7, the server of a learning group is an edge node, and it transmits participation request information to the central server, and the central server generates a key material and a key for encrypting a learning variable using the received information.

Also, it can be seen that the central server transmits an initial group key or the group key of the existing group to the edge node.

Referring to FIG. 8, it can be seen that the edge node requesting participation in the group generates the same key material as the central server using the participation request information transmitted to the central server and updates the group key by receiving the existing group key information.

The edge node transmits the initial group key information or the existing group key information, which is received from the central server, to a learning node, and the learning node generates a key material using the generated group key and performs an XOR operation on the key material and the received group key information, thereby generating a new group key.

Figure 9:
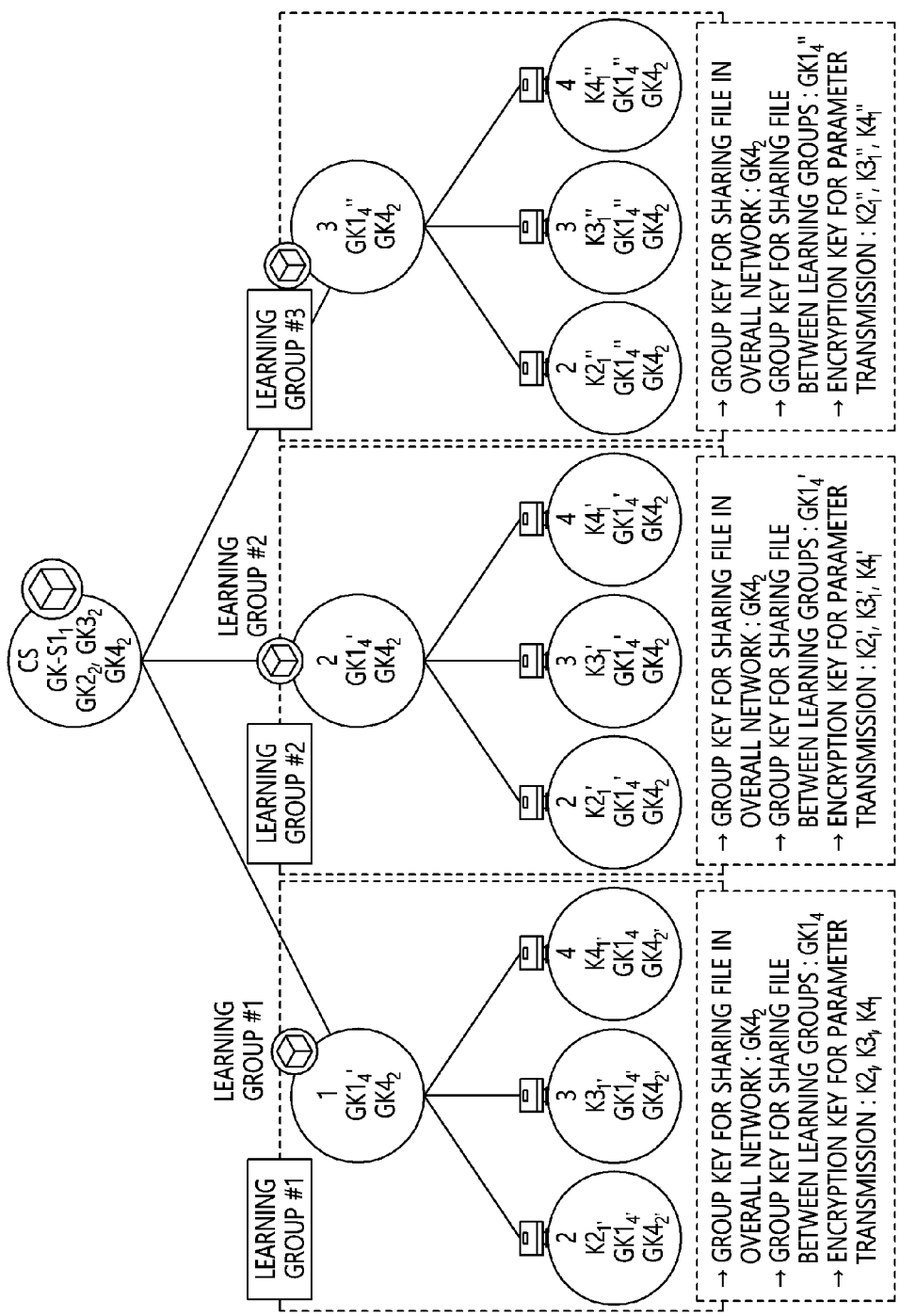
FIG. 9 is a view illustrating a hierarchical federated learning structure in which multiple learning groups participate according to an embodiment of the present disclosure.

FIG. 9 is a view illustrating a hierarchical federated learning structure in which multiple learning groups participate according to an embodiment of the present disclosure.

Referring to FIG. 9, it can be seen that, when data that respective learning groups should use in common for a learning process is shared, a central server generates a group key for encrypting the data, a group key for sharing files in the learning group, and a variable encryption key that is used for encrypting a learning variable in the federated learning process.

Figure 10:
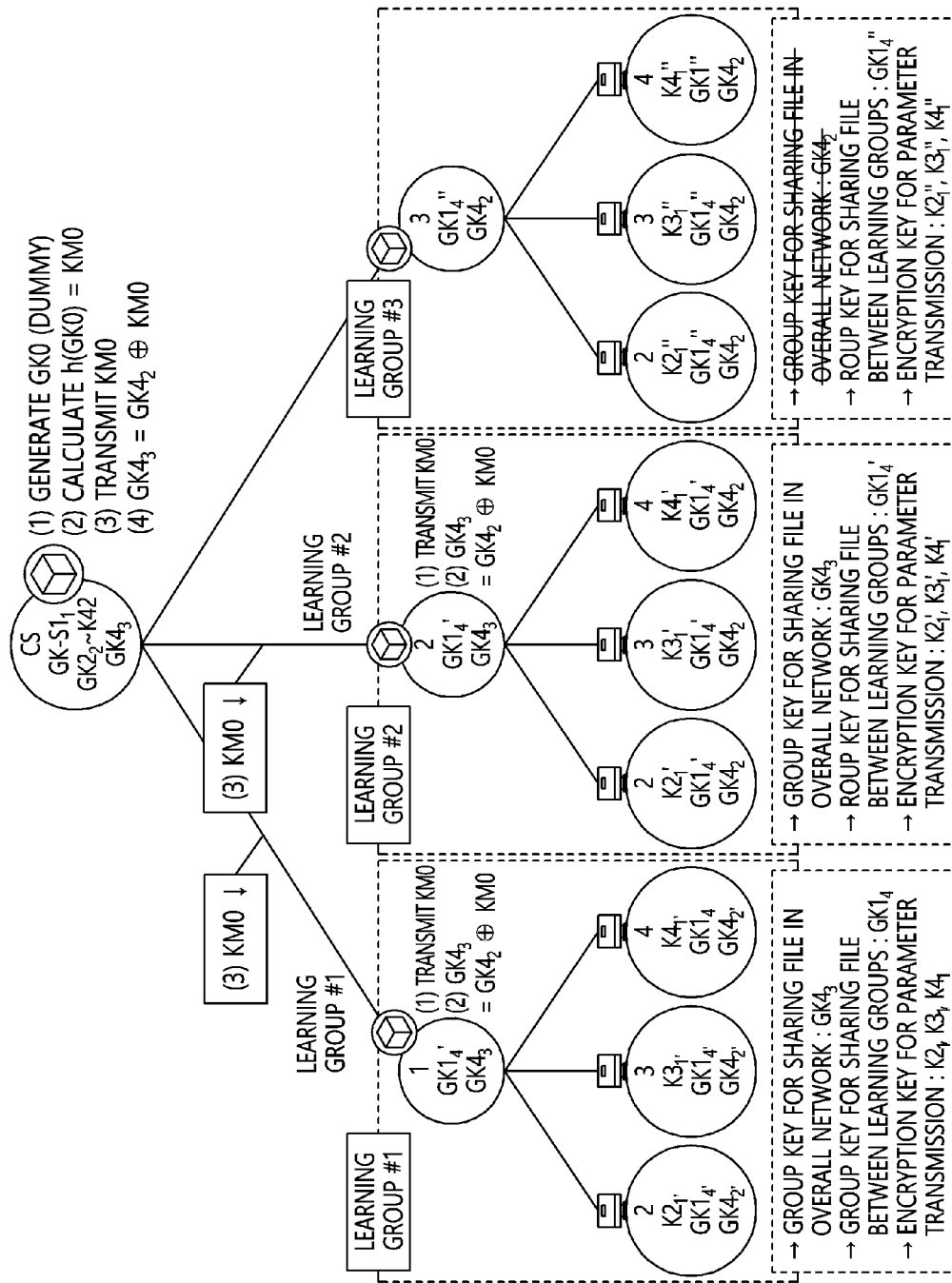
FIG. 10 is a view illustrating a process of leaving a central learning group of federated learning according to an embodiment of the present disclosure.

FIG. 10 is a view illustrating a process of leaving a central learning group of federated learning according to an embodiment of the present disclosure.

Referring to FIG. 10, it can be seen that a process in which a group participated in federated learning withdraws from the central learning group is illustrated. Because a learning group is operated based on each group key, a group key for sharing files in overall network, which is a group key shared within the central learning group, is updated in the learning groups, excluding the learning group requesting withdrawal.

Here, when it receives a withdrawal request from the edge node of the learning group that wants withdrawal, the central server may generate a dummy key material for the update to a new group key and transmit the dummy key material to the edge nodes of learning groups that want to stay in the central learning group.

Figure 11:
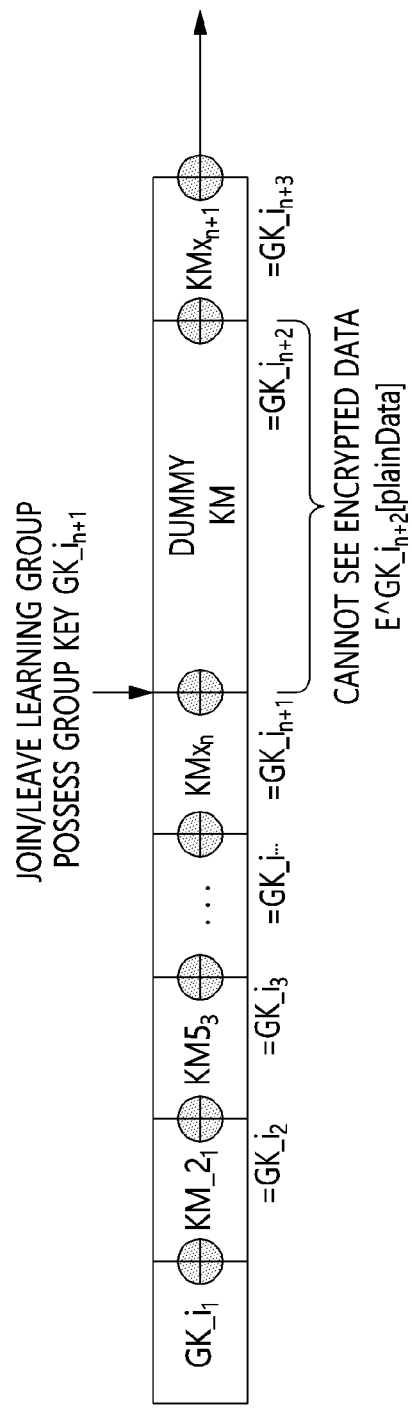
FIG. 11 is a view illustrating a process of updating a group key using a dummy key material according to an embodiment of the present disclosure.

FIG. 11 is a view illustrating a process of updating a group key using a dummy key material according to an embodiment of the present disclosure.

Referring to FIG. 11, it can be seen that a process of updating a group key using a dummy key material is illustrated.

When a new learning node participates in a group, a central server prevents the corresponding learning node from becoming aware of group key information used before the participation, thereby ensuring forward secrecy.

Also, when an existing learning node leaves a learning group, the central server updates a group key such that the corresponding learning node cannot access the group key information after leaving the learning group, thereby ensuring backward secrecy.

Figure 12:
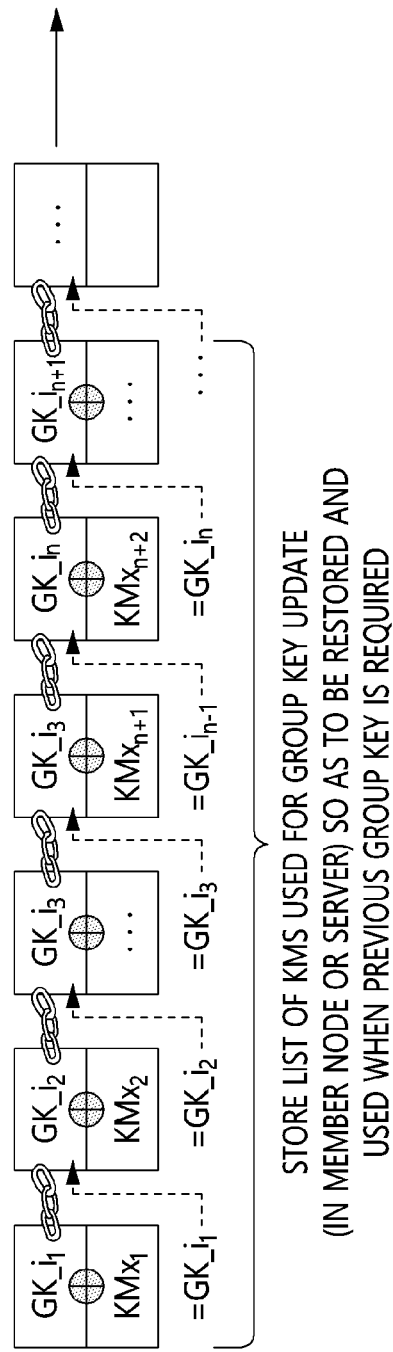
FIG. 12 is a view illustrating a process of forming a group key chain for facilitating group key management according to an embodiment of the present disclosure.

FIG. 12 is a view illustrating a process of forming a group key chain for facilitating group key management according to an embodiment of the present disclosure.

Referring to FIG. 12, it can be seen that a process of forming a group key chain is illustrated.

It can be seen that each group key is updated whenever participating nodes of a group change. Due to the update of the group key, the node newly participating in the learning group is prevented from accessing the group key used before participation. The group key may have a chain structure in which the key is updated by performing an XOR operation on the existing group key and a key material.

The learning node stores a list of key materials that were used in the group key update process in an edge node, which functions as a server, or in a central server for seamless service, so that a group key can be restored and used when it is required.

Also, the upper-level node of the learning group or the central server may retrieve the history of the group key because they know the key materials used to update the group key and the existing group key information in order to facilitate management.

Figure 13:
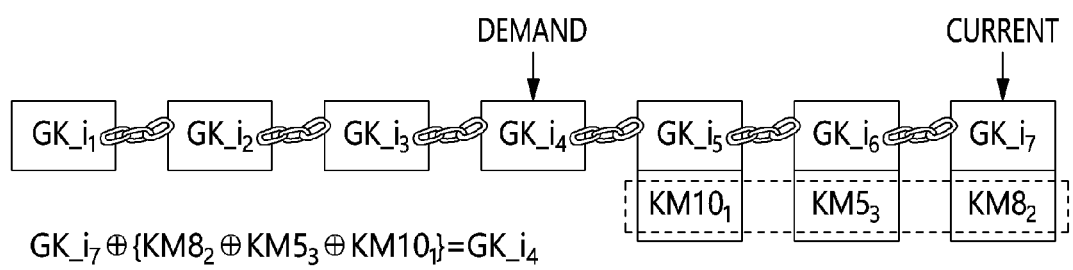
FIG. 13 is a view illustrating a process of restoring a group key used at a specific time according to an embodiment of the present disclosure.

FIG. 13 is a view illustrating a process of restoring a group key used at a specific time according to an embodiment of the present disclosure.

Referring to FIG. 13, it can be seen that a process of restoring a group key used at a specific time in order to access the data encrypted at the specific time is illustrated. The apparatus for federated learning based on group key management according to an embodiment of the present disclosure enables a group key at a specific time to be restored, thereby enabling a new learning node to access previous data for additional learning after participating in a learning group.

Figure 14:
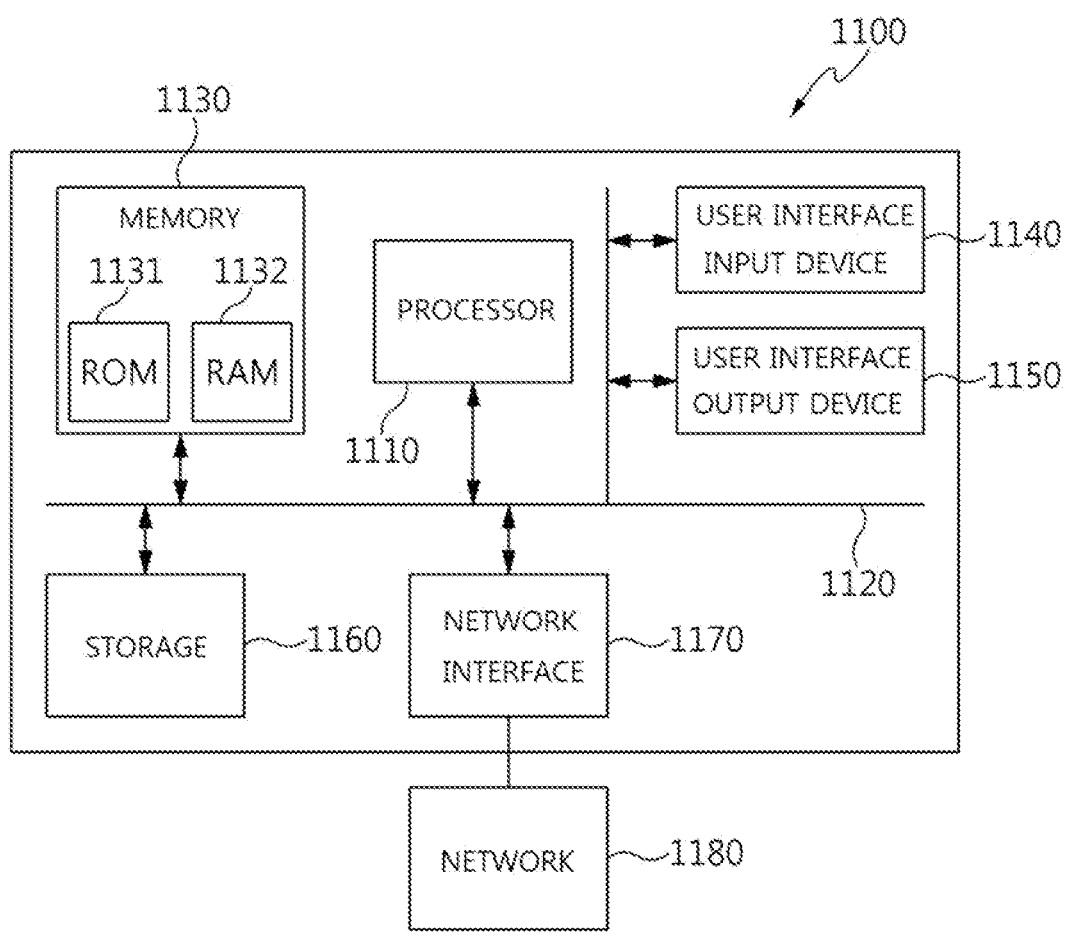
FIG. 14 is a view illustrating a computer system according to an embodiment of the present disclosure.

FIG. 14 is a view illustrating a computer system according to an embodiment of the present disclosure.

Referring to FIG. 14, the apparatus for federated learning based on group key management (the central server), the edge node, and the learning node according to an embodiment of the present disclosure may be implemented in a computer system 1100 including a computer-readable recording medium. As illustrated in FIG. 14, the computer system 1100 may include one or more processors 1110, memory 1130, a user-interface input device 1140, a user-interface output device 1150, and storage 1160, which communicate with each other via a bus 1120. Also, the computer system 1100 may further include a network interface 1170 connected to a network 1180. The processor 1110 may be a central processing unit or a semiconductor device for executing processing instructions stored in the memory 1130 or the storage 1160. The memory 1130 and the storage 1160 may be any of various types of volatile or nonvolatile storage media. For example, the memory may include ROM 1131 or RAM 1132.

The apparatus for federated learning based on group key management according to an embodiment of the present disclosure includes one or more processors 1110 and memory 1130 for storing at least one program executed by the one or more processors 1110. The at least one program receives learning group participation request information from a learning node that intends to participate in a federated learning group, updates a group key, which is required for the learning node to participate in the federated learning, using a key material generated by hashing the learning group participation request information, decrypts an encrypted local variable received from the learning node and thereby updates the same to a global variable, and transmits the global variable to the learning node after encrypting the global variable using the updated group key.

Here, the at least one program may generate an initial group key in the form of a random number.

Here, the at least one program may generate a new group key by performing an XOR operation on the key material and the initial group key.

Here, the learning node may generate a key material by hashing the learning group participation request information and generate a group key identical to the new group key by performing an XOR operation on the initial group key and the key material.

Here, the at least one program may generate a node key for encrypting a local variable of the learning node from the key material using a preset key derivation function.

Here, the learning node may generate the local variable and encrypt the same using the node key.

Here, the at least one program may decrypt the encrypted local variable received from the learning node using the node key.

The present disclosure may manage a learning group between a distributed edge network and a central server or between federated learning nodes and the central server or an edge node in order to operate and manage an AI-based network.

Also, the present disclosure solves a model privacy problem that may arise in a process of transmitting shared variables between participating nodes of a learning group, thereby providing maintenance and dynamic management functions for a secure federated learning mechanism.

Also, the present disclosure may build a scalable and secure federated learning environment in a mobile communication network environment.

Also, the present disclosure may be applied to state-of-the-art AI and federated-learning-based analysis/detection service fields to be applied to various distributed edge network environments, such as 5G, 6G, and the like, in the future.

As described above, the apparatus and method for federated learning based on group key management according to the present disclosure are not limitedly applied to the configurations and operations of the above-described embodiments, but all or some of the embodiments may be selectively combined and configured, so the embodiments may be modified in various ways.

What is claimed is:

1. An apparatus for federated learning based on group key management, comprising:
    one or more processors; and
    memory for storing at least one program executed by the one or more processors,
    wherein the at least one program
    receives learning group participation request information from a learning node that intends to participate in a federated learning group,
    updates a group key required for the learning node to participate in federated learning using a key material generated by hashing the learning group participation request information,
    decrypts an encrypted local variable received from the learning node and thereby updates the local variable to a global variable, and
    transmits the global variable to the learning node after encrypting the global variable using the updated group key,
    wherein the at least one program
    generates an initial group key in a form of a random number, and
    generates a new group key by performing an XOR operation on the key material and the initial group key,
    wherein the learning node generates the key material by hashing the learning group participation request information and performs the XOR operation on the initial group key and the key material, thereby generating a group key that is identical to the new group key.

2. The apparatus of claim 1, wherein the at least one program generates a node key for encrypting the local variable of the learning node from the key material using a preset key derivation function.

3. The apparatus of claim 2, wherein the learning node generates the local variable and encrypts the local variable using the node key.

4. The apparatus of claim 3, wherein the at least one program decrypts the encrypted local variable received from the learning node using the node key.

5. A method for federated learning based on group key management, performed by an apparatus for federated learning based on group key management, comprising:
    receiving learning group participation request information from a learning node that intends to participate in a federated learning group;
    updating a group key required for the learning node to participate in federated learning using a key material generated by hashing the learning group participation request information;
    decrypting an encrypted local variable received from the learning node and thereby updating the local variable to a global variable; and
    transmitting the global variable to the learning node after encrypting the global variable using the updated group key,
    wherein receiving the learning group participation request information comprises generating an initial group key in a form of a random number,
    wherein updating the group key comprises generating a new group key by performing an XOR operation on the key material and the initial group key, and
    wherein updating the group key comprises generating, by the learning node, the key material by hashing the learning group participation request information and performing, by the learning node, the XOR operation on the initial group key and the key material, thereby generating a group key identical to the new group key.

6. The method of claim 5, wherein receiving the learning group participation request information comprises generating a node key for encrypting the local variable of the learning node from the key material using a preset key derivation function.

7. The method of claim 6, wherein updating the local variable comprises generating, by the learning node, the local variable and encrypting, by the learning node, the local variable using the node key.

8. The method of claim 7, wherein transmitting the global variable comprises decrypting the encrypted local variable received from the learning node using the node key.

* * * * *